United States Patent
Nagel et al.

(10) Patent No.: US 9,813,383 B2
(45) Date of Patent: Nov. 7, 2017

(54) SYSTEMS AND METHODS FOR RE-COMMISSIONING A CONTROLLED DEVICE IN A HOME AREA NETWORK

(75) Inventors: Paul E. Nagel, Draper, UT (US); William B. West, Sandy, UT (US)

(73) Assignee: Control4 Corporation, Salt Lake City, UT (US)

( * ) Notice: Subject to any disclaimer, the term of this patent is extended or adjusted under 35 U.S.C. 154(b) by 357 days.

(21) Appl. No.: 12/858,231

(22) Filed: Aug. 17, 2010

(65) Prior Publication Data

US 2011/0047370 A1   Feb. 24, 2011

Related U.S. Application Data

(60) Provisional application No. 61/234,968, filed on Aug. 18, 2009.

(51) Int. Cl.
| | | |
|---|---|---|
| G06F 7/04 | (2006.01) |
| H04L 29/06 | (2006.01) |
| H04L 29/08 | (2006.01) |
| H04L 12/12 | (2006.01) |

(Continued)

(52) U.S. Cl.
CPC ...... *H04L 63/0428* (2013.01); *H04L 12/2821* (2013.01); *H04L 12/2836* (2013.01); *H04L 63/061* (2013.01); *H04L 67/125* (2013.01); *H04L 12/12* (2013.01); *H04L 12/2818* (2013.01); *H04L 41/04* (2013.01); *H04L 41/0654* (2013.01); *H04L 41/0833* (2013.01);

(Continued)

(58) Field of Classification Search
CPC ......... H04L 63/08; H04L 63/10; H04L 63/20; H04L 29/06; H04L 63/0428; H04L 12/2821; H04L 67/125; H04L 63/061; H04L 12/2836
See application file for complete search history.

(56) References Cited

U.S. PATENT DOCUMENTS

2006/0206433 A1   9/2006   Scoggins
2007/0257813 A1   11/2007  Vaswani et al.

(Continued)

OTHER PUBLICATIONS

Vasundhara Ghate et al. "THe solution for efficient electricity management through wireless sensor network," IJCSN, pp. 279-283 . vol. Issue 5, Oct. 2014.*

(Continued)

*Primary Examiner* — Luu Pham
*Assistant Examiner* — Canh Le
(74) *Attorney, Agent, or Firm* — Austin Rapp

(57) ABSTRACT

Systems and methods for preparing and re-commissioning a controlled device in a home area network are described. A utility meter is communicated with. An authentication key and encryption data for communicating with the utility meter may be determined. The authentication key and encryption data are sent to a controlled device. A set of translation rules for a message are determined. The translation rules are sent to the controlled device. The controlled device establishes a secure communication link with the utility meter using the authentication key and the encryption data. The controlled device receives a request to change power usage from the utility meter over the secure communication link. The controlled device translates the request to change power usage into control instructions using the translation rules.

13 Claims, 12 Drawing Sheets

(51) Int. Cl.
*H04L 12/28* (2006.01)
*H04L 12/24* (2006.01)

(52) U.S. Cl.
CPC ........ *H04L 41/0893* (2013.01); *H04L 63/126* (2013.01); *Y02B 90/244* (2013.01); *Y04S 20/327* (2013.01)

(56) References Cited

U.S. PATENT DOCUMENTS

| | | |
|---|---|---|
| 2008/0219210 A1 | 9/2008 | Shuey et al. |
| 2008/0219239 A1 | 9/2008 | Bell et al. |
| 2009/0062970 A1 | 3/2009 | Forbes, Jr. et al. |
| 2009/0138099 A1* | 5/2009 | Veillette .......................... 700/22 |

OTHER PUBLICATIONS

Y Lee et al. Design of hybrid authentication scheme and key distribution for mobile multi-hop relay in IEEE 802.16j, ACM, pp. 1-7, Jun. 3-5, 2009.*

ZigBee Alliance, "ZigBee Home Automation Public Application Profile," ZigBee Document 053520r25, Revision 25, Version 1.0, Oct. 2007.
ZigBee Alliance, "ZigBee Smart Energy Profile Specification," ZigBee Document 075356r14, Revision 14, May 2008.
ZigBee Alliance, "ZigBee Smart Energy Profile Specification," ZigBee Document 075356r15, Revision 15, May 2008.
ZigBee Alliance, "ZigBee IP Specification," ZigBee Document 095023r10, Revision 10, Jul. 2010.
ZigBee Alliance, "ZigBee IP Application Support Specification," ZigBee Document 095446r06, Revision 06, Aug. 2010.
ZigBee Alliance, "Smart Energy Profile 2.0 Technical Requirements Document," ZigBee-105553, Apr. 2010.
International Search Report issued for International Patent Application No. PCT/US2010/045918 on Oct. 1, 2010.
European Search Report issued for European Patent Application No. 10810559.4 on Jul. 3, 2014.
International Preliminary Report on Patentability issued for International Patent Application No. PCT/US2010/045918 dated Mar. 1, 2012.

* cited by examiner

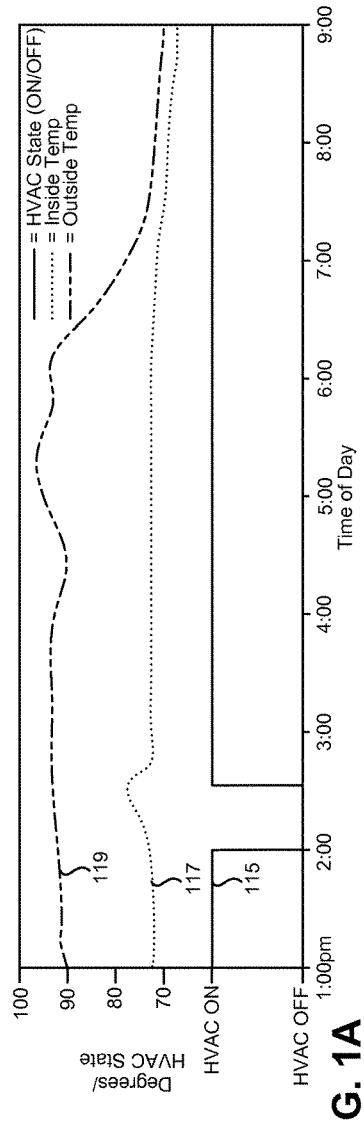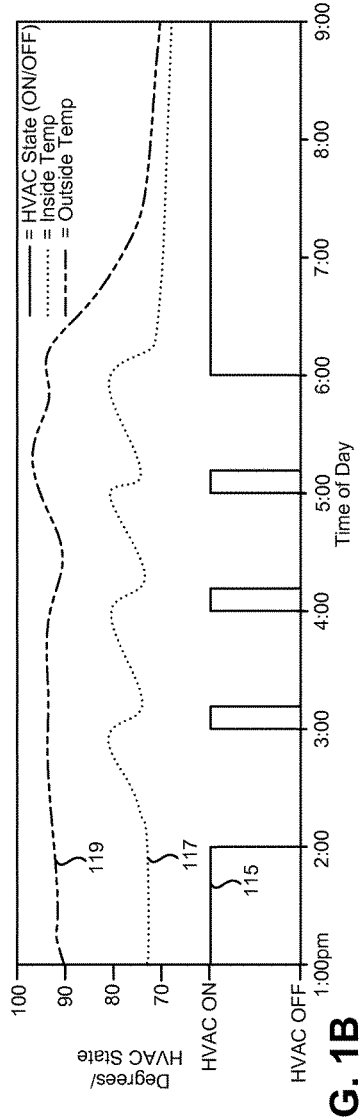
FIG. 1A
FIG. 1B

SYSTEMS AND METHODS FOR RE-COMMISSIONING A CONTROLLED DEVICE IN A HOME AREA NETWORK

RELATED APPLICATIONS

This application is related to and claims priority from U.S. Provisional Patent Application Ser. No. 61/234,968, filed Aug. 18, 2009, for "Systems and Methods for Re-Commissioning a Controlled Device in a Home Area Network," with inventors Paul E. Nagel, and William B. West.

TECHNICAL FIELD

The present disclosure relates generally to home area networks. More specifically, the present disclosure relates to re-commissioning a controlled device in a home area network.

BACKGROUND

In recent years, the price of electronic devices has decreased dramatically. In addition, the types of electronic components that can be purchased have continued to increase. For example, DVD players, large screen TVs, multi-carousel CD and DVD players, MP3 players, video game consoles, and similar consumer electronic items have become more widely available while continuing to drop in price.

The decreasing prices and increasing types of electronic components have packed today's homes and businesses with modern conveniences. As more of these components are sold, the average household power consumption also increases. Typical homes and businesses now include more power-consuming devices than ever before. With the increasing demands for power, at times power consumption may approach the limit on the capacity to generate power. If the consumption gets too close to the upper limit on power generation capacity, power outages and/or disruptions, such as blackouts and brownouts, may occur.

To avoid such power disruptions, a region may build infrastructure to increase power generation. However, increasing power generation for a geographic region is often very expensive. Thus, it may be more cost effective to determine ways to decrease consumption. As such, there is a need for improved systems and methods for decreasing power consumption while limiting the adverse effects as much as possible.

BRIEF DESCRIPTION OF THE DRAWINGS

FIG. 1A is a chart illustrating one configuration of a system using the directive model;

FIG. 1B is a chart illustrating one configuration of a system using the objective model;

DETAILED DESCRIPTION

Figure 1C:
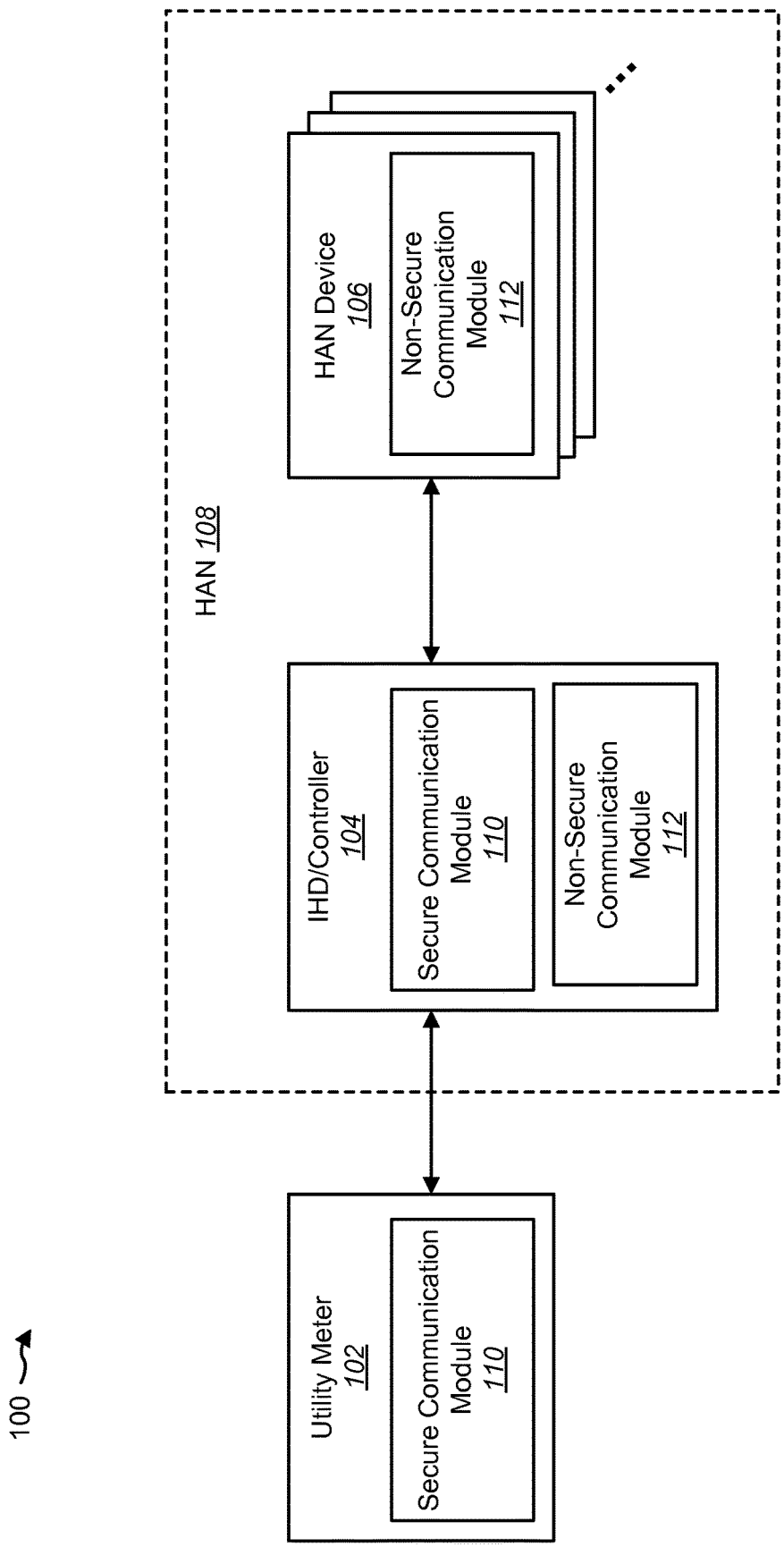
FIG. 1C is a block diagram illustrating one configuration of a system for re-commissioning a controlled device in a home area network.

A method for preparing a controlled device to re-commission itself in a home area network is disclosed. A utility meter is communicated with. An authentication key and encryption data are determined for communicating with the utility meter. The authentication key and encryption data are sent to a controlled device. A set of translation rules are determined for a message. The translation rules are sent to the controlled device.

The communicating may comprise communicating using the ZigBee Smart Energy profile. The sending may comprise sending using the ZigBee Home Automation profile. The message may comprise a request to reduce power consumption in the controlled device. The translation rules may comprise rules for translating the message into control instructions specific to the controlled device. The message may be received from the utility meter. The message may comprise a request to reduce power consumption in the controlled device. The message may be translated into control instructions specific to the controlled device. The control instructions may cause the controlled device to comply with the message. New translation rules may be determined when a user preference on the controlled device is changed. The new translation rules may be sent to the controlled device.

An apparatus for preparing a controlled device to re-commission itself in a home area network is also disclosed. The apparatus includes a processor and memory in electronic communication with the processor. Executable instructions are stored in the memory. The instructions are executable to communicate with a utility meter. The instructions are also executable to determine an authentication key and encryption data for communicating with the utility meter. The instructions are also executable to send the authentication key and encryption data to a controlled device. The instructions are also executable to determine a set of translation rules for a message. The instructions are also executable to send the translation rules to the controlled device.

A computer-readable medium for preparing a controlled device to re-commission itself in a home area network is also disclosed. The computer readable medium comprises executable instructions. The instructions are executable for communicating with a utility meter. The instructions are also executable for determining an authentication key and encryption data for communicating with the utility meter. The instructions are also executable for sending the authentication key and encryption data to a controlled device. The instructions are also executable for determining a set of translation rules for a message. The instructions are also executable for sending the translation rules to the controlled device.

A method for re-commissioning a controlled device in a home area network is also disclosed. An authentication key and encryption data are received from a computing device. Translation rules are received from the computing device. A secure communication link is established with a utility meter using the authentication key and the encryption data. A request to change power usage is received in a controlled device from the utility meter over the secure communication link. The request to change power usage is translated into control instructions using the translation rules.

The establishing may comprise establishing using the ZigBee SE profile. The method may further comprise executing the control instructions. The receiving may comprise receiving during a start-up sequence of the computing device.

An apparatus for preparing a controlled device to re-commission itself in a home area network is also disclosed. The apparatus includes a processor and memory in electronic communication with the processor. Executable instructions are stored in the memory. The instructions are executable to receive an authentication key and encryption data from a computing device. The instructions are also executable to receive translation rules from the computing device. The instructions are also executable to establish a secure communication link with a utility meter using the authentication key and the encryption data. The instructions are also executable to receive a request to change power usage in a controlled device from the utility meter over the secure communication link. The instructions are also executable to translate the request to change power usage into control instructions using the translation rules.

The terms "power" and "energy" may be used interchangeably herein. It is to be understood that "power" generally refers to a rate of consumption and anything measured in watts while "energy" generally refers to a unit of work measured in kWh and similar units of energy. However, the term "power" may be used herein to refer to both. Therefore the term "power" as used herein may refer to a rate of transfer, use, or generation of electrical energy as well as electrical energy itself.

As the demand for power approaches the capacity to generate power, it may be desirable to either increase generation capacity, reduce consumption, or some combination of the two. Since increasing generation capacity may be prohibitively expensive, an increasing amount of focus is now on intelligently reducing consumption without affecting lifestyle. One way this problem has been approached has been to use a directive model, where a power generation facility sends a directive to a home to perform a very specific action. For example, the thermostat in a home may receive a message from a power facility requesting that the setting on the home's thermostat be raised by four degrees on a hot day in order to save power. The thermostat may then follow this directive and change the programmed setting. However, identical messages received by different thermostats may produce inconsistent power savings. In other words, these directives may produce different results in different homes, e.g., a home with shade may warm up slower on a hot day than a home with no shade. When the directive has been accomplished (raising the inside temperature by four degrees), then the program may proceed as usual. Therefore, the exact duration and amount of reduction in power consumption may be unknown before a directive is actually sent in this model.

Another way to intelligently reduce power consumption may be an objective model. In this model, a power generation facility may send an objective to a home that is more general, e.g., reduce power consumption. This means that rather than simply sending a specific task, as in the directive model, the objective model allows some type of decision based logic in the home to determine how to accomplish the objective. For example, if the objective is to reduce power consumption by the heating and cooling system by five percent over the next hour, a Home Area Network controller within the home may determine and implement appropriate settings for the heating and cooling system. This objective approach may provide for better power reduction with limited lifestyle adjustments.

FIG. 1A is a chart illustrating one configuration of a system implementing the present systems and methods using the directive model. FIG. 1B is a chart illustrating one configuration of a system implementing the present systems and methods using the objective model. In other words, FIGS. 1A and 1B may further illustrate the distinction between the directive model and the objective model. The solid lines 115 may represent the state of the heating and cooling system as a function of time, e.g., ON or OFF. The dotted lines 117 may represent the temperature inside a home as a function of time. The dashed lines 119 may represent the outside temperature as a function of time.

In FIG. 1A, the home may have received a directive to raise the set point of the heating and cooling system to 78 degrees Fahrenheit. In the illustrated configuration, the outside temperature exceeds 90 degrees. Therefore, the directive may be complied with very quickly. In other words, the heating and cooling system may turn OFF for only one half of an hour, thus resulting in minimal power reduction. In such a configuration, a power provider may have estimated more reduction in power consumption from the directive, and therefore be required to send more directives to achieve the desired power reduction it requires. This may be inefficient and costly.

In FIG. 1B, however, the home may have received an objective to reduce power consumption by 20 percent from 2:00 pm to 6:00 pm. A Home Area Network controller may use decision logic based on a user's preferences and choose to cycle the heating and cooling system in order to comply with the objective. In the illustrated configuration, the heating and cooling system may turn ON for a short period then OFF for a longer period during the specified time period. This may result in slightly higher temperatures during this period, but also vastly reduced power consumption compared to the directive model in FIG. 1A. Therefore, the objective model may provide better power reduction with minimal lifestyle discomfort because it allows decision logic within the home to determine and implement the best way to achieve desired power reduction based on gathered data, e.g., user preferences, current home settings, etc.

The improved power reduction resulting from using the objective model may have several advantages. First, it may allow a utility provider, such as a power company, to more accurately avoid peak demand. Utility providers may be required to keep a certain percentage of power generation capacity available for critical services, e.g., hospitals, emergency responders, etc. Thus, at peak periods, like midday, the utility provider may be able to send objectives to reduce power consumption in order to avoid peak demand and avoid having to buy more power generation from other providers.

The objective model may also benefit power consumers by saving them money through efficient reduction in power consumption. For example, a power company may determine the rates charged for power by taking the peak consumption period over a defined time period, e.g., the highest day's consumption in the previous month. Therefore, the higher a consumer's peak, the higher the rate charged for the entire month. Under this billing structure, a consumer may wish to limit their peak periods of power consumption in order to reduce their monthly rate. Likewise, a power company may charge a higher flat rate during peak hours than during non-peak hours. Under this billing structure, a consumer may wish to limit consumption during the period with the highest rate. Likewise, a power company may charge a flat rate that changes every hour. Under this billing structure, a consumer may wish to limit their power consumption when they are informed of a high rate for the upcoming hour. Thus, efficient reduction of power consumption may lower a consumer's cost of power under any rate structure, e.g., tiered pricing, flat rate, hourly variable, etc.

Despite the advantages of the objective model, it is still not ideal. More specifically, the exact power reduction in response to an objective may not be known because the various states/configurations and preferences of the homes to which the objective is sent are not known. For example, if a cooling system in a home was not running, an objective to reduce heating and cooling consumption would not result in any reduction. Likewise, a home may not comply with this type of request. It may be inefficient and time-consuming for a power facility to achieve a specific load reduction by trial and error Additionally, various components in a home network may fail at any time. Therefore, it may be desirable to prepare devices in the home to receive and comply with the requests from the power facilities directly. In other words, it may be desirable for a home area network device to re-commission itself in case a home area network controller fails.

Figure 10:
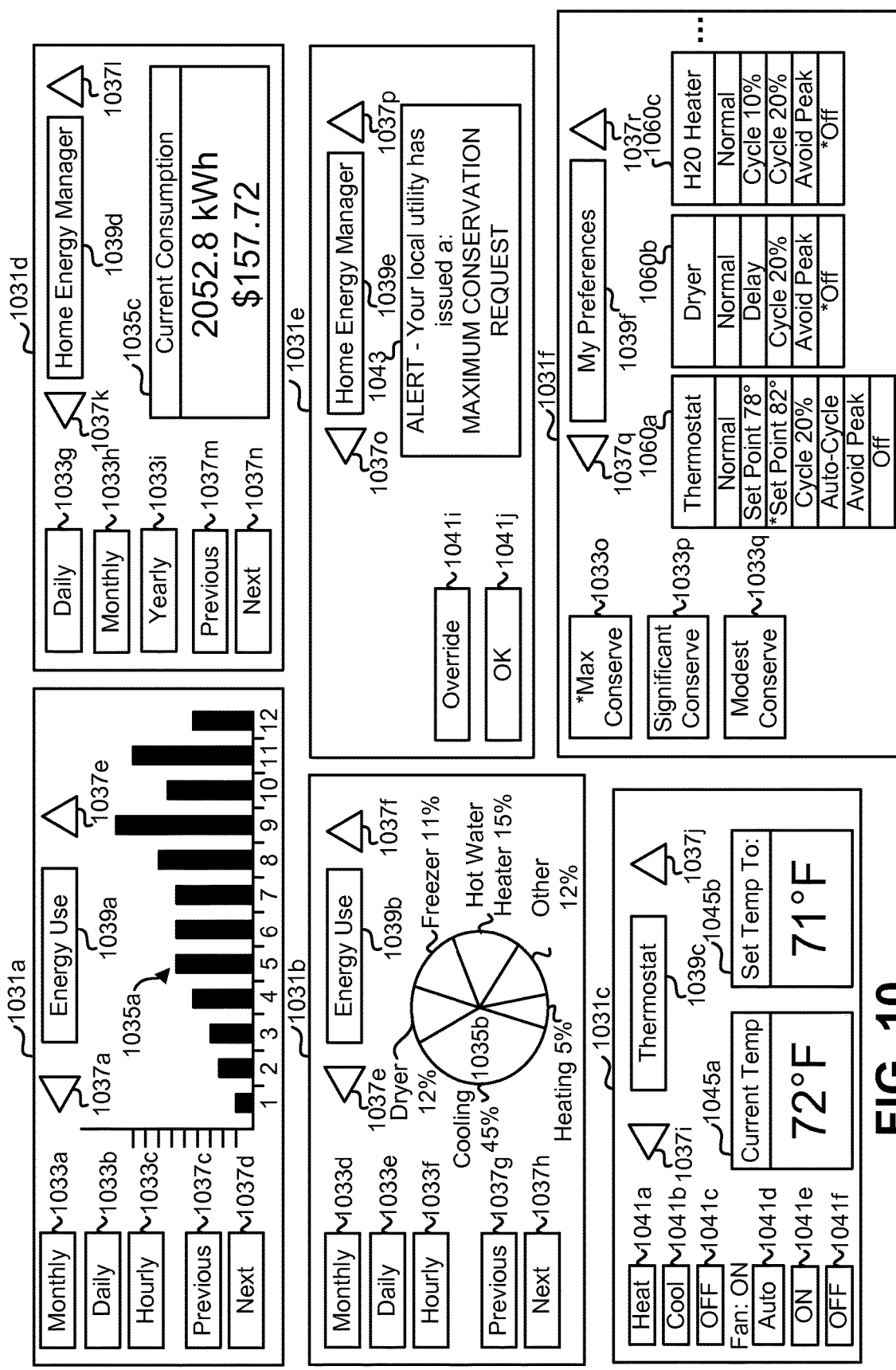
FIG. 10 is a block diagram illustrating multiple configurations of a screenshot on an In-Home Display.

FIG. 10 is a block diagram illustrating one configuration of a system 100 for re-commissioning a controlled device in a home area network. The system 100 may include a utility meter 102, an in-home display (IHD) 104, and one or more home area network (HAN) devices 106. The utility meter 102 may be any device capable of measuring consumption of a utility, such as power, and communicating with an IHD 104, a HAN device 106, and a power system (not shown). Additionally, the utility meter 102 may communicate with the IHD 104 using a secure communication module 110 that enables encrypted, secure communication. One example of a secure communication protocol that may be used by the utility meter 102 when communicating with the IHD 104 is the ZigBee Smart Energy (ZigBee SE) profile by the ZigBee Alliance. This protocol may provide a low-power, wireless, encrypted link between the utility meter 102 and the IHD 104. Alternatively, the utility meter 102 may use various methods to communicate including, but not limited to, an infrared (IR) connection, an Ethernet connection, a wireless connection using the 802.11g (WiFi) standard, or other wired or wireless connections. Examples of utility meters 102 may include a power/electricity meter, a water meter, a gas meter, etc.

One type of message the utility meter 102 may send or repeat is a demand response. As used herein the term "demand response" refers to a request from a utility system 102 for decreased utility consumption. While a demand response may be used in the illustrated configurations, the present systems and methods may be used other general utility messages, such as a request to change power usage in some way. A utility system may send a demand response based on current consumption and generation. For example, a utility system may gather data from many utility meters 102 in a power grid about current and anticipated power consumption and send a demand response to some or all of the HAN devices 106 in the power grid if the anticipated consumption exceeds power generation capacity.

A HAN 108 may be a group of controlled devices, such as HAN devices 106, operating in the same environment. Examples of HAN devices 106 include, without limitation, a thermostat, a light switch, a washer, a dryer, a furnace, an air conditioner, a pool controller, etc. The HAN devices 106 may communicate with the IHD 104 using a non-secure communication module 112 that may reside on the IHD 104 and the HAN device(s) 106. One example of a non-secure communication module 112 that may be used by the HAN device 106 when communicating with the IHD 104 is the ZigBee Home Automation (ZigBee HA) profile by the ZigBee Alliance. This protocol may provide a multi-purpose, wireless link between the HAN devices 106 and the IHD 104. Alternatively, the HAN device 106 may communicate using various methods including, but not limited to, an infrared (IR) connection, an Ethernet connection, a wireless connection using the 802.11g (WiFi) standard, or other wired or wireless connections.

In one configuration, the utility meter 102 may receive a demand response from a utility system and pass it to the IHD 104. The demand response may be a request for a particular power consumption objective, e.g., reduce power consumption in the heating and cooling system by five percent over the next 2 hours. Since the utility meter 102 may include important usage and account data, the utility meter 102 may use a secure protocol, such as ZigBee SE to communicate with the IHD 104. The IHD 104 may then translate the demand response into control functions for the specific HAN devices 106. In other words, the IHD 104 may determine how to most efficiently, in light of user preferences, comply with the demand response. The IHD 104 may send the control functions to the HAN device 106 using a non-secure protocol, such as ZigBee HA. Alternatively, the IHD 104 may supply the necessary data to allow the HAN device 106 to re-commission itself to directly communicate with the utility meter 102. This will be described below.

Figure 2:
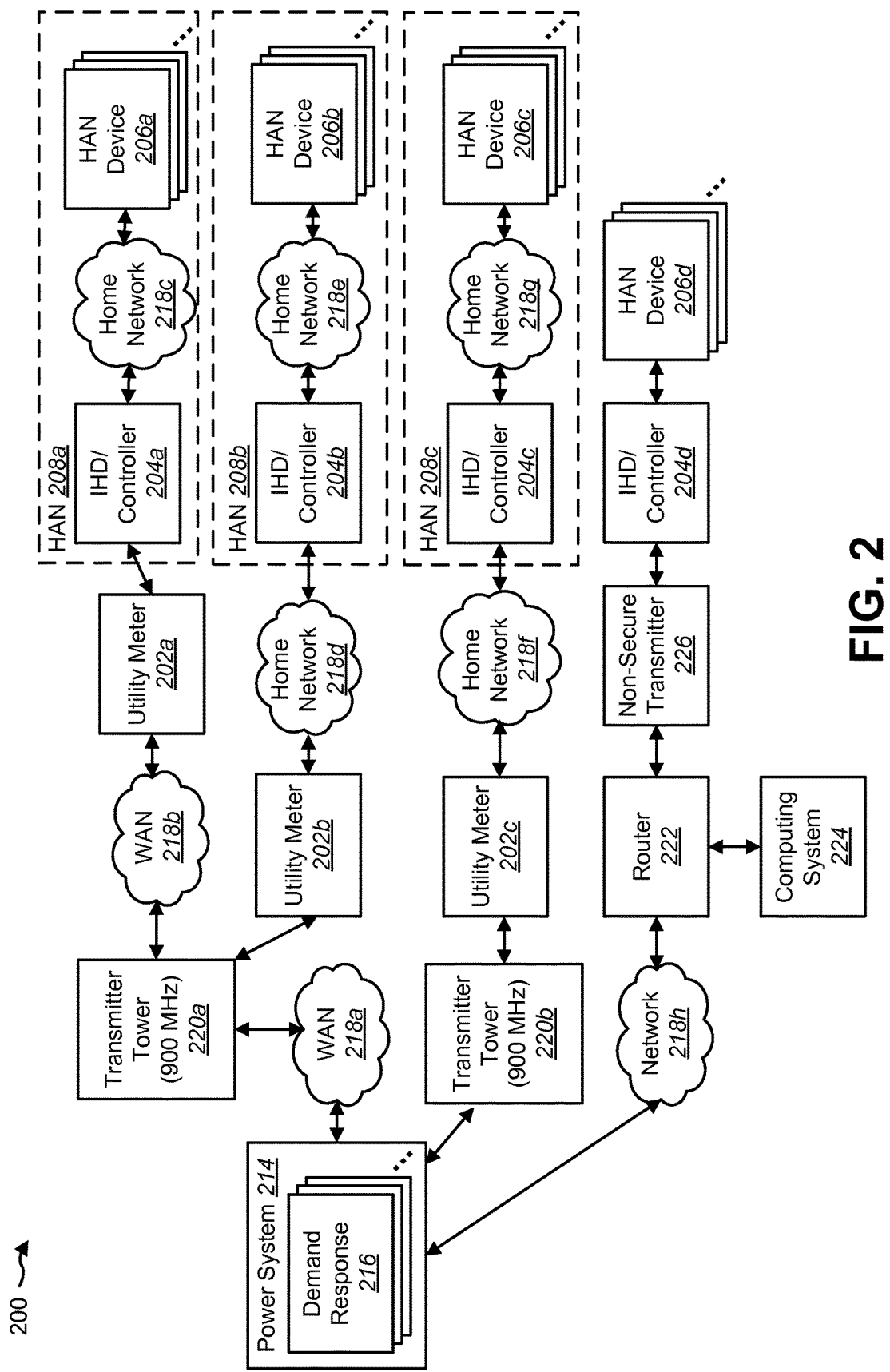
FIG. 2 is a block diagram illustrating another configuration of a system for re-commissioning a controlled device in a home area network.

FIG. 2 is a block diagram illustrating another configuration of a system 200 for re-commissioning a controlled device in a home area network to communicate directly with a utility meter. There may be a power system 214 that may send one or more demand responses 216 to HAN devices 206. The power system 214 may communicate with the HAN devices 206 through one or more networks 218. The power system 214 may be a facility, or part of a facility, that generates power for a geographic region using a variety of techniques, e.g., coal, nuclear, solar, wind, geothermal, etc. Additionally, the power system 214 may utilize one or more transmitter towers 220, utility meters 202, IHDs 204, or some combination thereof when communicating with the HANs 208.

In one configuration, the transmitter towers 220 may communicate with all the utility meters 202 in a geographic region over a proprietary communication link, e.g., a 900 MHz spread spectrum, wireless channel. The utility meters 202 may then communicate with the IHDs 204 using a secure link, e.g., Zigbee SE. Lastly, the IHDs 204 may communicate with the HAN devices 206 using a non-secure link, e.g., ZigBee HA. In this way, a power system 214 may transmit the demand responses 216 to the HAN devices 206 in a power grid. Alternatively, the transmitter towers 220, utility meters 202, IHDs 204, and HAN devices 206 may use various combinations of the network elements described to communicate.

Various networks 218 may be employed with the systems and methods described herein, e.g., wide area networks (WAN), and home networks. The term "network" as used herein, may refer to the Internet, one or more wide area networks (WANs), or one or more local area networks (LANs), etc. Networks may be implemented using wired and/or wireless communication technologies and may use any available protocols to electronically communicate. In other words, the networks 218 may be implemented using one or more of the following connections or protocols: an infrared (IR) connection, an Ethernet connection, one of the 802.11 (WiFi) wireless standards, hypertext transfer protocol (HTTP), file transfer protocol (FTP), secure file transfer protocol (SFTP), ZigBee SE, ZigBee HA, Z-Wave by Zensys, Global System for Mobile communications (GSM), any of the HomePlug standards, Broadband over Power Lines (BPL), Power Line Communication (PLC), other proprietary serial protocols, etc.

Many configurations of networks 218 are possible. For example, in one configuration, the power system 214 communicates using spread spectrum communication designed to cover a large geographic area, e.g., WANs 218a, 218b. Conversely, the communication between the utility meters 202 and the HANs 208 and within the HANs 208 may use home networks 218c, 218d, 218e, 218f, 218g using infrared or serial technology designed for short-range, cost-effective communication, e.g., ZigBee SE and ZigBee HA. It should be appreciated that many different configurations of networks 218 may be possible, e.g. the WANs 218a, 218b may use 802.11 technology and the home networks 218c, 218d, 218e, 218f, 218g may use GSM technology. Any technology capable of transmitting data between the various illustrated devices may be used.

In another configuration, the power system 214 may transmit the demand responses 216 to the HAN devices 206 using a network 218h, such as the Internet. In other words, there may be HAN devices 206 residing in locations without utility meters 202, or at least without utility meters 202 capable of communicating as described above. Thus, the power system 214 may send the demand responses 216 to the HAN devices 206d using a router 222 with an attached non-secure transmitter 226, e.g., a ZigBee HA transmitter. The non-secure transmitter 226 may transmit the demand responses 216 to the HAN devices 206 directly or via an IHD 204. The router 222 may be controlled by a computing system 224, such as a personal computer.

The IHD 204 may be a device capable of communicating with the utility meter 202 and the HAN devices 206 using a wireless protocol, such as ZigBee SE or ZigBee HA. Furthermore, the IHD 204 may include a user interface and a display, such as a liquid crystal display (LCD). The IHD 204 may display information relating to the HAN devices 206 to a user and receive input from the user. The IHD 204 may also control the various devices 206 in the HANs 208, according to user preferences and received demand responses 216, and may store data about the devices 206 and the HANs 208 as a whole. Each IHD 204 may control one or more HANs 208. Alternatively, there may be more than one IHD 204c for one HAN 208c. Therefore, the terms "IHD" and "controller" may be used interchangeably.

Figure 3:
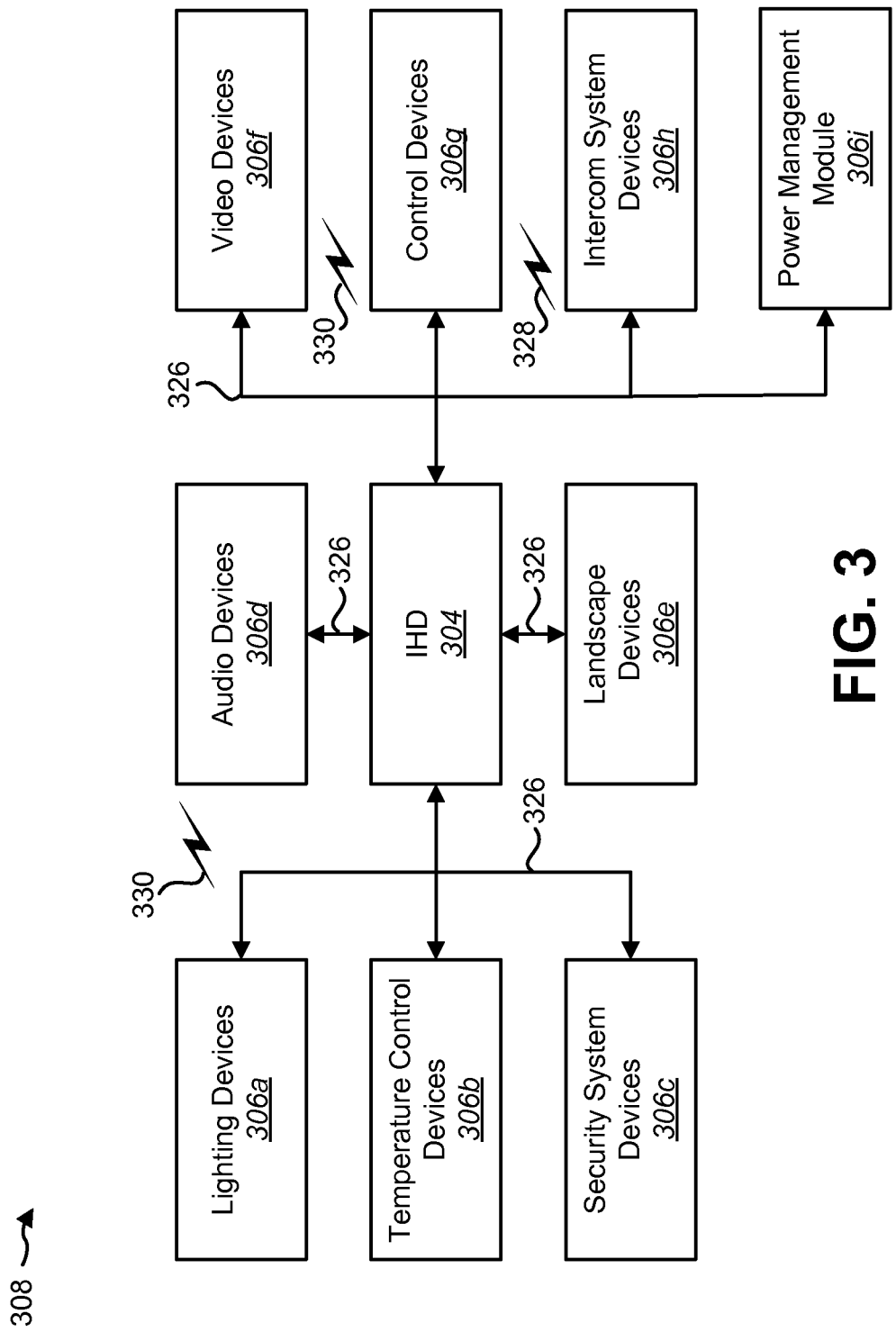
FIG. 3 is a block diagram illustrating a configuration of a home area network.

FIG. 3 is a block diagram illustrating a configuration of a HAN 308. The HAN 308 may include an IHD 304 and one or more HAN devices 306. The IHD 304 may be in electronic communication with the devices 306. The HAN 308 may include multiple IHDs 304, but typically requires that one of the IHDs 304 is designated as the primary IHD 304.

The IHD 304 may be connected to the devices 306 via wireless or wired connections. In the present configuration, the IHD 304 may be connected to the devices 306 via an Ethernet connection 326, a WiFi connection 328, a ZigBee HA connection 330, or a combination of the three. The IHD 304 may be capable of communicating via these network connections, i.e. Ethernet 326, WiFi 328, ZigBee HA 330, or other types of connections.

The devices 306 may include lighting devices 306a, temperature control devices 306b, security system devices 306c, audio devices 306d, landscape devices 306e, video devices 306f, control devices 306g, intercom system devices 306h, and a power management module 306i. Lighting devices 306a may include light switches, dimmers, window blinds, etc. Temperature control devices 306b may include thermostats, fans, fireplaces, and the like. Security system devices 306c may include security cameras, motion detectors, door sensors, window sensors, gates, or other security devices. Audio devices 306d may include AM/FM radio receivers, XM radio receivers, CD players, MP3 players, cassette tape players, and other devices capable of producing an audio signal. Landscape devices 306e may include sprinkler system devices, drip system devices, and other landscape related devices. Video devices 306f may include televisions, monitors, projectors, and other devices capable of producing a video signal. The control devices 306g may include touch screens, keypads, remote controls, and/or other control devices 306g capable of communicating with and/or controlling another device 306. Intercom system devices 306h may include intercom microphones, intercom related video devices, and other devices typically associated with an intercom system. The power management module 306i may include the actual control mechanism for the other devices 306. In other words, the power management module 306i may include the control functions that implement functionality for complying with requests for reduced power consumption, e.g., demand responses.

Figure 4:
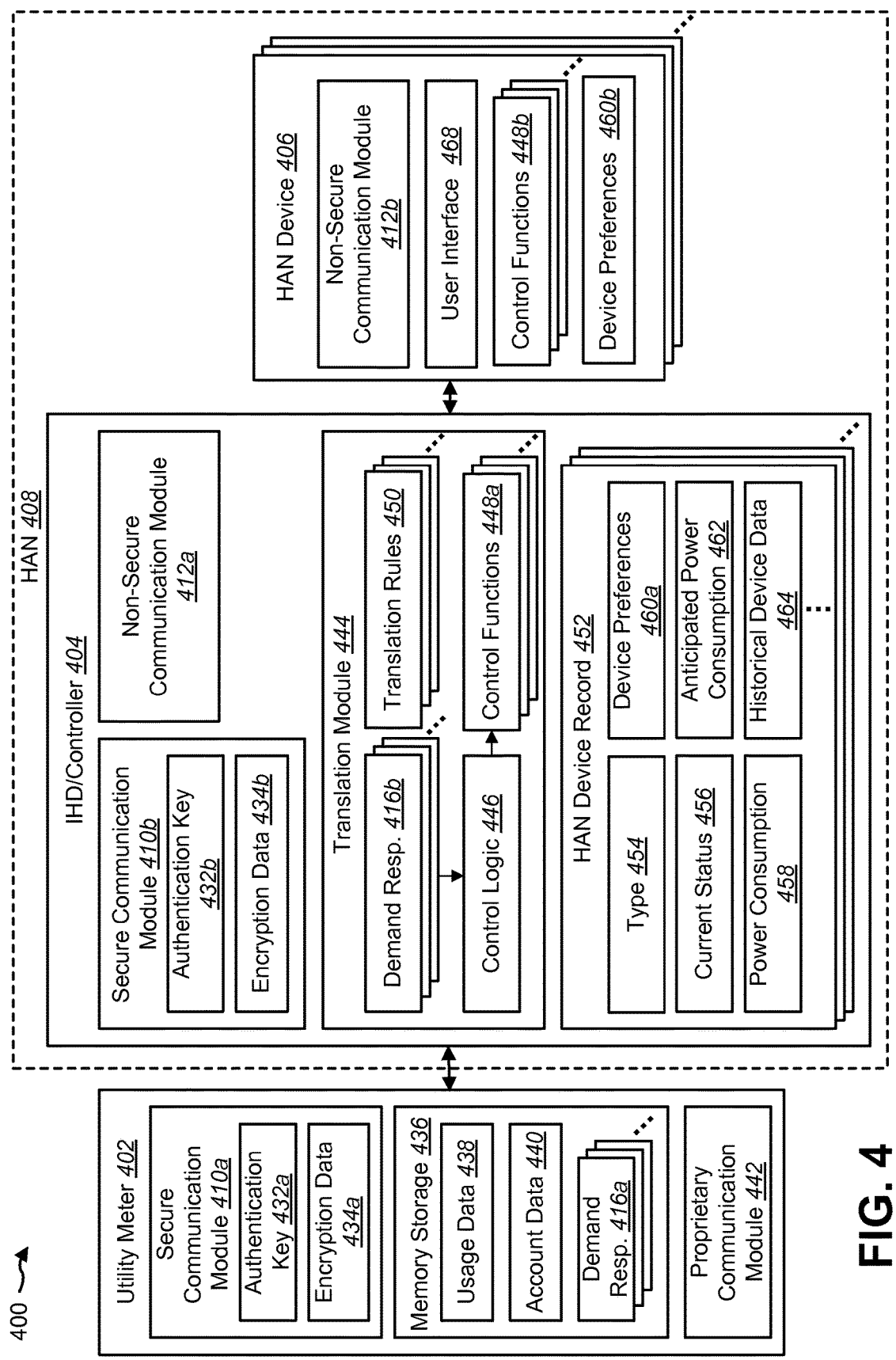
FIG. 4 is a block diagram illustrating another configuration of a system for re-commissioning a controlled device in a home area network.

FIG. 4 is a block diagram illustrating another configuration of a system 400 for re-commissioning a controlled device in a home area network. A utility meter 402 may include a secure communication module 410 that includes an authentication key 432 and encryption data 434. The utility meter 402 may include a memory or other storage medium 436 that includes customer usage data 438 and account data 440. Because the usage data 438 and account data 440 may be confidential, the utility meter 402 may use a secure, encrypted link to communicate with the IHD 404. For example, the utility meter 402 and the IHD 404 may communicate using the ZigBee SE profile. The utility meter 402 may also receive demand responses 416 that it passes to the IHD 404 and ultimately the HAN devices 406. Additionally, the utility meter 402 may include a proprietary communication module 442 for communicating with the transmitter towers wirelessly (e.g., with a 900 MHz spread spectrum, wireless channel, etc.). Alternatively, the utility meter 402, the IHD 404, and the HAN devices 406 may communicate using various methods including, but not limited to, an infrared (IR) connection, an Ethernet connection, a wireless connection using the 802.11g (WiFi) standard, or other wired or wireless connections.

The IHD 404 may receive demand responses 416 from the utility meter 402 using the secure communication module 410. Once received, a translation module 444 may translate the demand response 416 before sending control functions 448 to the HAN devices 406. For example, the demand response 416 may request that the power consumption in a HAN device 406 be reduced by 5% over the next hour. If received directly, the HAN devices 406 may not be able comply with that objective. Thus, the control logic 446 in the translation module 444 may translate the objective in the demand response to specific control functions 448. Control functions 448 may include instructions that control the operation of HAN devices 406. For example, a control function 448 may change the set point on a thermostat, change the setting on a light controller to ON, change the heat setting on a dryer, etc. In other words, the control logic 446 may translate demand responses 416 from objectives to directives. The control functions 448 may not be the only means of controlling the HAN devices 406. In other words, a user may also change the set point on a thermostat on the thermostat itself or turn the lights ON using the light controller itself in addition to using control functions 448 provided by the IHD 404.

The control logic 446 may operate based on data in one or more device records 452 that may include device data collected from the device 406 as well as learned behavior data. Examples of device data include, without limitation, the type of device 454, current status of the device 456, power consumption of the device 458, device preferences 460, and historical device data 464. Examples of learned behavior include, without limitation, anticipated power consumption 462, typical device load, time behaviors, house load coefficients, etc. For example, the IHD 404 may receive a demand response 416 requesting that the power consumption in the HAN 408 be reduced by 5% over the next hour. The control logic 446 may determine that (a) the washer and dryer are both OFF based on the current status 456, (b) the home owner does not want to adjust the heating and cooling system for non-mandatory demand responses 416 based on device preferences, and (c) the pool heater is consuming 10% of the power consumed in the HAN 404. Thus, based on this data from the device records 452, the control logic may determine that the pool heater should be cycled over the next hour to comply with the demand response 416. So, the control logic 446 may produce control functions 448 and send them to the pool controller (HAN device) 406.

The HAN devices 406 may include a non-secure communication module 412 to communicate with the IHD 404 that uses a non-secure protocol, e.g., ZigBee HA. The term "non-secure" as used herein may refer to protocols that are less secure than secure protocols, e.g., ZigBee HA may include a less robust authentication process and encryption than ZigBee SE. Additionally, the HAN device 406 may include control functions 448b received from the IHD 404 or a user through a user interface 468. Device preferences 460b may also be stored on the HAN devices 406.

The IHD 404 may also enable the HAN device 406 to communicate directly with the utility meter 402, or re-commission itself to communicate and/or otherwise interact with the utility meter 402. This may include creating and sending translation rules 450 to enable the HAN device 406 to translate and comply with the demand responses 416a from the utility meter 402. In other words, if the IHD 404 is disabled for some reason, the HAN device 406 may still be able to receive and comply with demand responses 416a from the utility meter 402 using the translation rules 450. The re-commissioning of the HAN device 406 to the utility meter 402 may also include establishing a secure communication module 410 on the HAN device 406.

Note also that the demand responses 416 may be received via the Internet rather than a utility meter 402. Thus, the HAN device 402 may re-commission itself to connect to the Internet directly.

Figure 5:
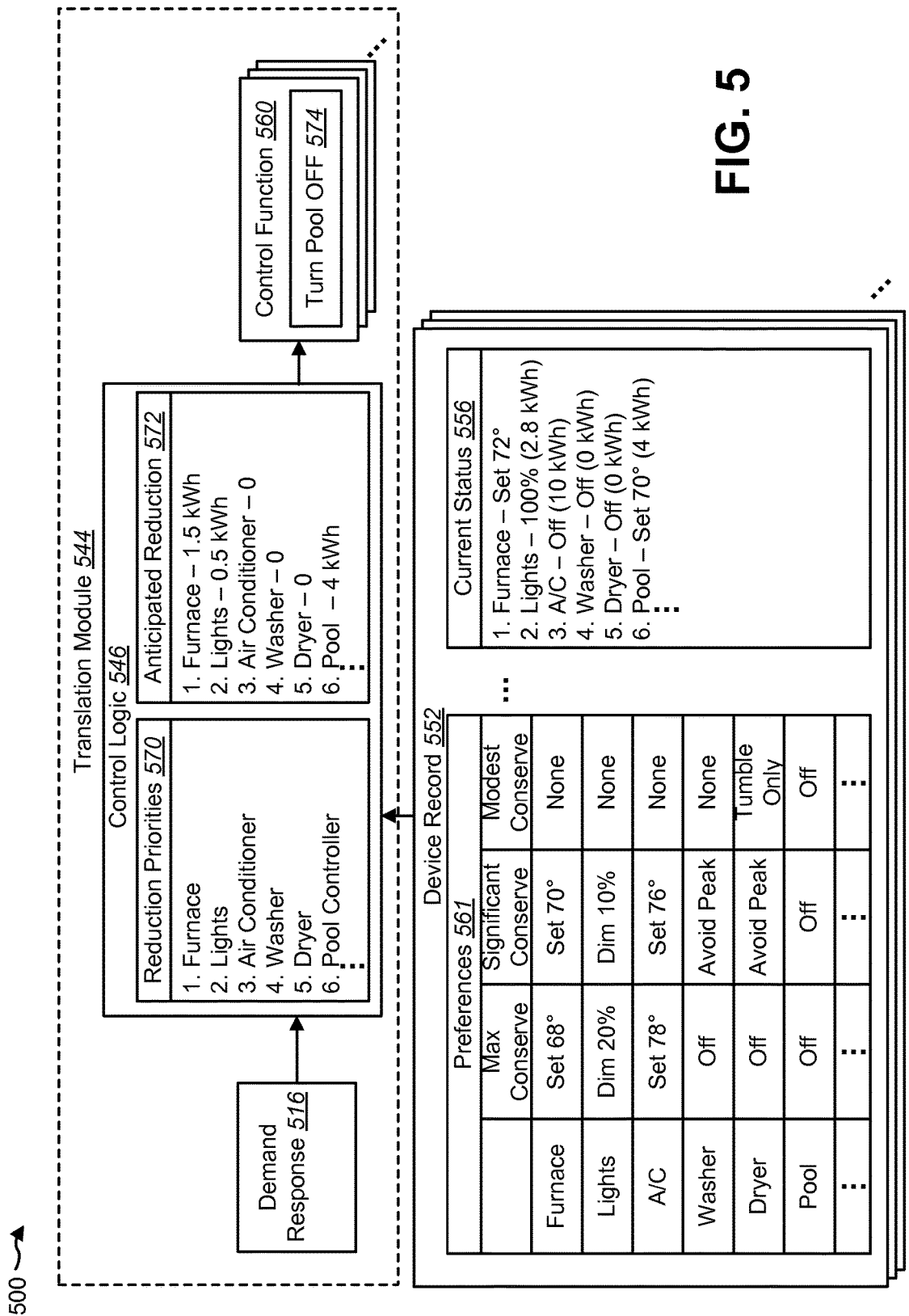
FIG. 5 is a block diagram illustrating a system for translating a demand response.

FIG. 5 is a block diagram illustrating a system 500 for translating a demand response 516. The system 500 may reside in an IHD 404. The IHD 404 may receive a demand response 516 from a utility meter 402. Alternatively, the demand response 516 may be received from the Internet. Based on user preferences 561 and the current device status 556, among other data, the control logic 546 may produce control functions 560 for the HAN devices 406 in order to comply with the demand response 516. To do this, the control logic 546 may use a set of reduction priorities 570 and a list of anticipated reduction 572 for each HAN device 406. The reduction priorities 570 may indicate, based on user input, the order of HAN devices 406 from which reduction should be sought. In the illustrated configuration, the pool controller should be changed first, then the dryer, then the washer, etc. The anticipated reduction 572 may indicate the reduction in power consumption by each HAN device 406 if the devices 406 were managed according to user preferences 561 based on the current status 556 of each device 406. For illustration purposes, an example will now be described.

If the demand response 516 is a significant conserve request, the control logic 546 may prepare the list of anticipated reduction 572 from the significant conserve preferences 561 and the current status 556 of the devices 406. In other words, changing the furnace from 72 degrees (the current status) to 70 degrees (the significant conserve preference) would result in 1.5 kWh savings. Likewise, changing the lights from 100% (current status) to 90% (the significant conserve preference) would result in 0.5 kWh savings. However, according to the current status data structure 556, the air conditioner, washer, and dryer are already OFF. Thus, no savings would result from implementing the significant conserve preferences in the air conditioner, washer, and dryer. In the same manner, changing the pool heater from a set point of 70 degrees (current status) to OFF (the significant conserve preference), would result in a savings of 4 kWh. Then, based on the reduction priorities 570, the control logic 546 may produce control functions 560 for each device 406 until the demand response 516 has been complied with. Thus, the first control function 560 produced may be a turn pool OFF command 574. If that alone complies with the demand response 516, there may not be another control function 560. For example, if significant conserve denotes a 10% reduction in power consumption, and the 4 kWh consumed by the pool is 10% of the power consumption in the HAN 408, the lights may not need to be dimmed and the furnace may not need to be adjusted to 70 degrees. If, however, 4 kWh is not enough to comply with the demand response 516, the control logic 546 may produce more possible actions, e.g., dim lights by 10%. Alternatively, all devices 406 may be managed in accordance with the device preferences 561 without regard to the amount of reduction requested by the demand response 516. In other words, the control logic 546 would produce control functions 560 for the pool, lights, and furnace even if the pool control function 560 alone would be sufficient.

Figure 6:
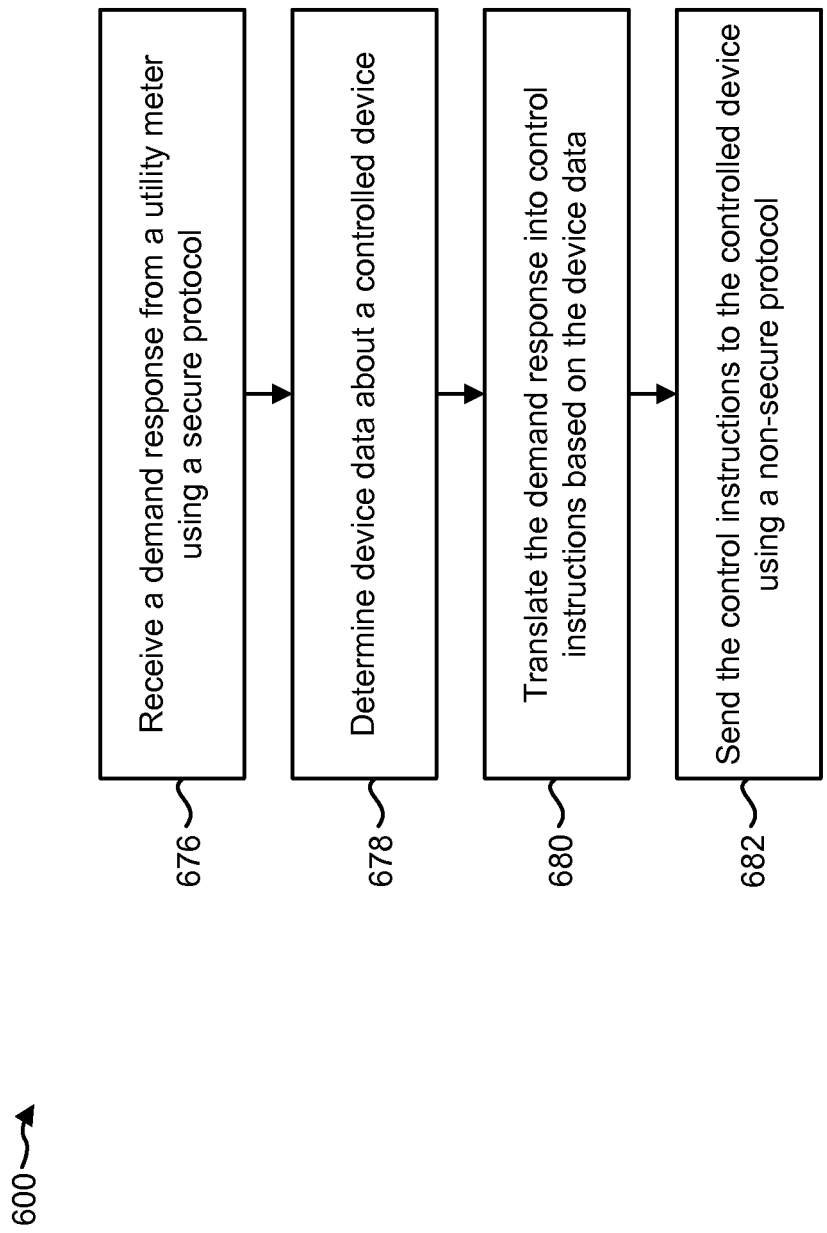
FIG. 6 is a flow diagram illustrating a method for translating a demand response.

FIG. 6 is a flow diagram illustrating a method 600 for translating a demand response 416. The method 600 may be performed in an IHD 404. The IHD 404 may receive 676 a demand response 416 from a utility meter 402 using a secure protocol, such as ZigBee SE. Alternatively, the demand response 416 may be received from the Internet.

This may include using an authentication key 432 and encryption data 434 to communicate. The IHD 404 may then determine 678 device data about a controlled device, such as a HAN device 406. The device data may include device data collected from the device as well as learned behavior data. Examples of device data include, among other data, the type of device 454, current status of the device 456, power consumption of the device 458, device preferences 460, and historical device data 464. Examples of learned behavior include, among other data, anticipated power consumption 462, typical device load, time behaviors, house load coefficients, etc. The IHD 404 may translate 680 the demand response 416 into control instructions/functions 448 based on the device data. This may include translating objectives into directives that may be implemented by the HAN device 406. Lastly, the IHD 404 may send 682 the control instructions to the device 406 using a non-secure protocol, such as ZigBee HA.

Alternatively, the utility meter 402, the IHD 404, and the HAN devices 406 may communicate using various methods including, but not limited to, an infrared (IR) connection, an Ethernet connection, a wireless connection using the 802.11g (WiFi) standard, or other wired or wireless connections.

Figure 7:
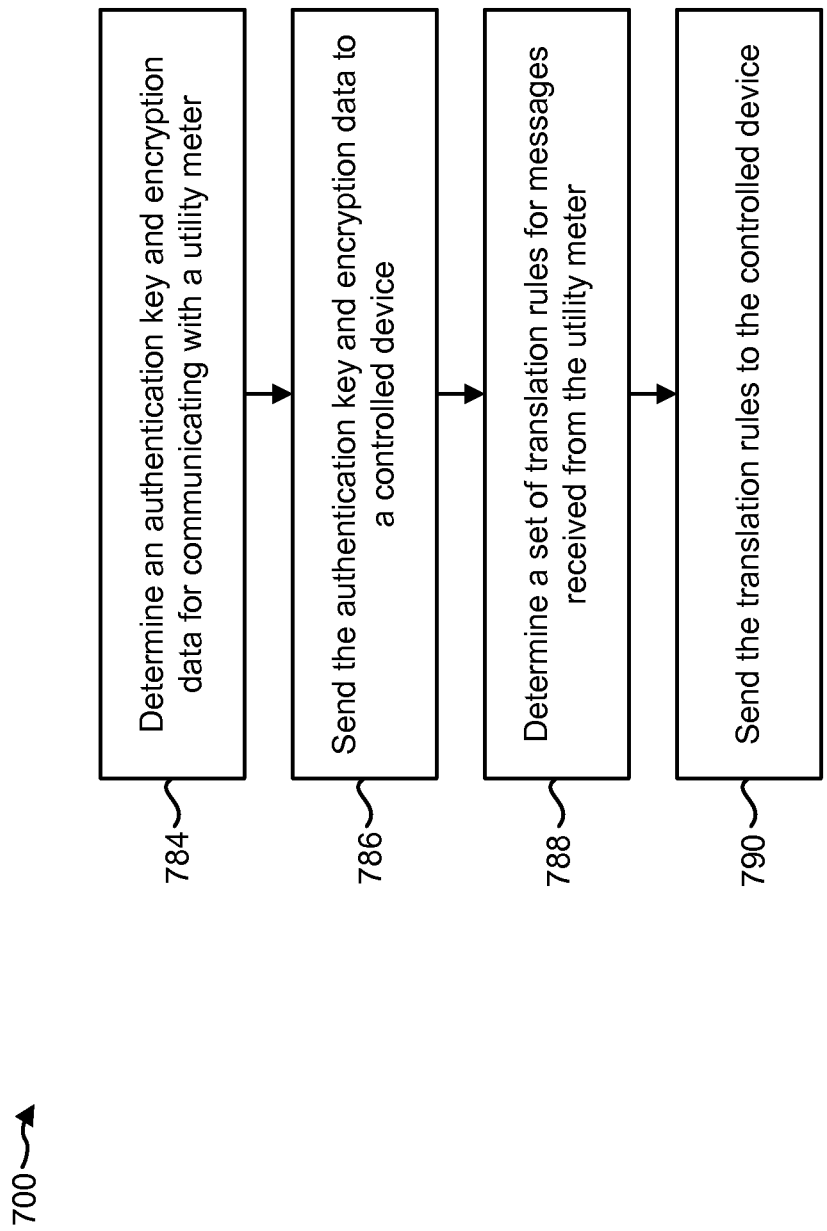
FIG. 7 is a flow diagram illustrating a method for preparing a controlled device to re-commission itself in a home area network.

FIG. 7 is a flow diagram illustrating a method 700 for preparing a controlled device to re-commission itself in a home area network 408 to communicate directly with and/or otherwise interact with a utility meter 402. The method 700 may be performed by an IHD 404. As described earlier, a utility meter 402 may include confidential information, such as usage data 438 and account data 440. In order to protect this data, the utility meter 402 may use a secure communication protocol, such as ZigBee SE, that utilizes an authentication key 432 and encryption data 434. However, the HAN devices 406 may not be able to use such a secure protocol. Thus, if the IHD 404 is disabled, the HAN device 406 may be incapable of receiving and complying with demand responses 416 from the utility meter 402. One approach may be to re-commission the HAN devices 406 to communicate with the utility meter 402. In other words, the IHD 404 may enable the HAN devices 406 to communicate directly with the utility meter 402 or the Internet.

The method 700 may be performed in an IHD 404 and may as part of a power-up sequence or shortly thereafter. Furthermore, the IHD 404 may perform the method 700 for all HAN devices 406 with which it communicates. First, the IHD 404 may determine 784 an authentication key 432 and encryption data 434 for communicating with a utility meter 402 or the Internet. The IHD 404 may send 786 the authentication key 432 and encryption data 434 to a controlled device, such as a HAN device 406. This may enable the HAN device 406 to communicate securely with the utility meter 402, or the Internet, over a secure protocol, such as ZigBee SE, if the IHD 404 is disabled. However, the HAN device may still be incapable of complying with some or all of the demand responses 416 sent from the utility meter 402 because the HAN device 406 does not include the control logic 446 for translating objective demand responses 416 into directive control functions 448. Thus, the IHD 404 may determine 788 a set of translation rules 450 for messages received from the utility meter 402, such as demand responses 416. The translation rules 450 may be produced from control logic 446 in the IHD 404. In other words, the translation rules 450 may be a subset of the rules used by the control logic 446 in the IHD 404. These translation rules 450 may be produced once, or every time any preferences 460 in the device 406 change. Lastly, the IHD 404 may send 790 the translation rules 450 to the controlled device 406.

Figure 8:
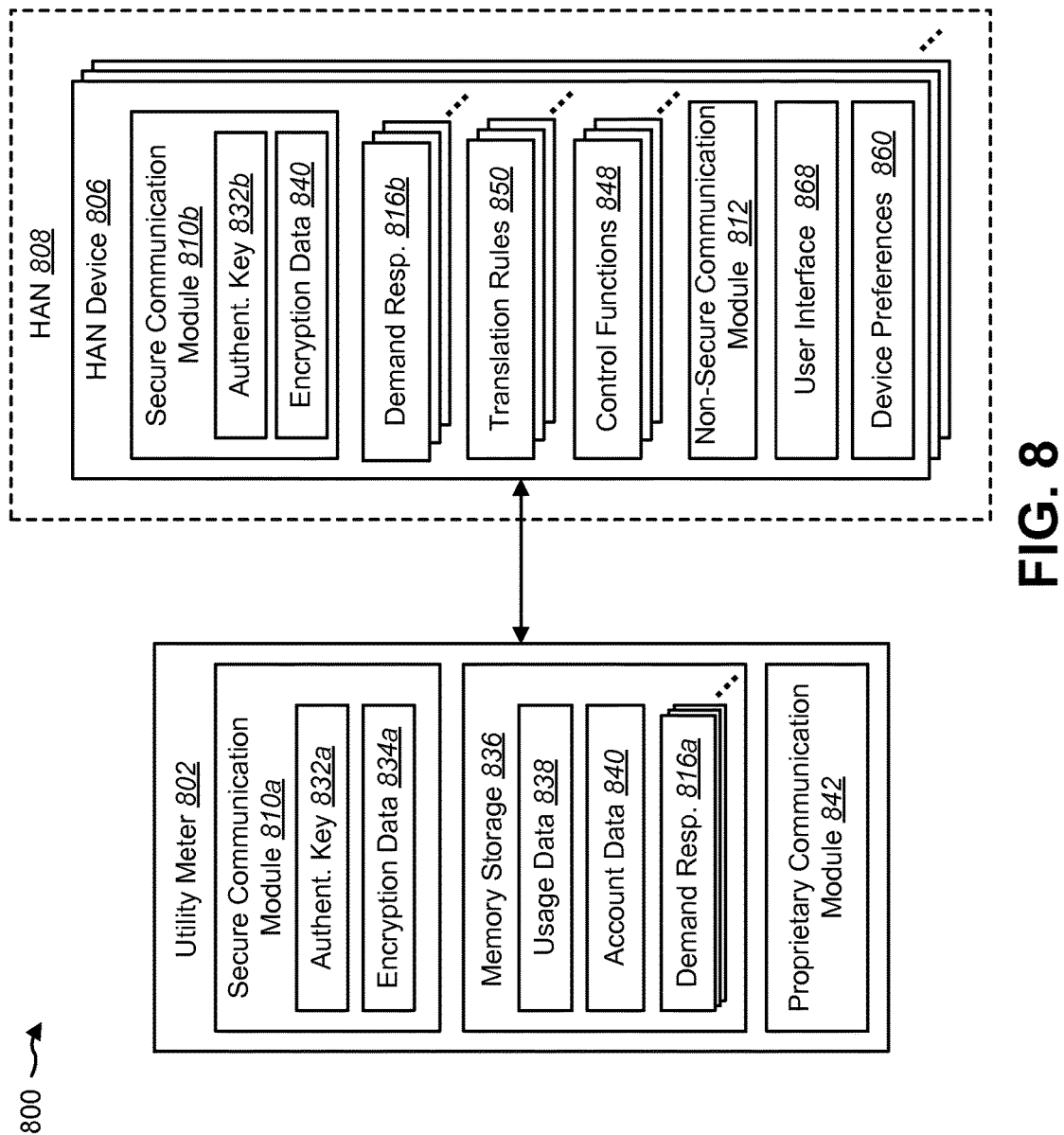
FIG. 8 is a block diagram of a system for re-commissioning a controlled device in a home area network.

FIG. 8 is a block diagram of a system 800 for re-commissioning a controlled device 806 in a home area network 808. In other words, the illustrated configuration shows a HAN device 806 re-commissioned, or able to communicate directly with a utility meter 802. As before, the utility meter 802 may communicate using a secure protocol, such as ZigBee SE, to protect confidential usage data 838 and account data 840. The secure protocol may utilize an authentication key 832*a* and encryption data 834*a*. The utility meter 802 may also receive demand responses 816*a* that it passes to the HAN devices 806. Additionally, the utility meter 802 may include a proprietary communication module 842 for communicating with a transmitter tower (e.g., over a 900 MHz spread spectrum, wireless channel, etc.).

In this system 800, however, there may be no IHD 404 serving as an intermediary between the utility meter 802 and the HAN devices 806. The IHD 404 may have been disabled in some way, but may have enabled the HAN devices 806 to communicate directly with the utility meter 802. Thus, the HAN devices 806 may now include a secure communication module 810*b* with the authentication key 832*b* and encryption data 840 necessary to communicate using the secure protocol, such as ZigBee SE. Likewise, the IHD 404, before being disabled, may have sent a set of translation rules 850 to the HAN devices 806 to enable the devices to translate and comply with the demand responses 816*a* from the utility meter 802. Thus, the HAN devices 806 may create the control functions 848 rather than receiving them from an IHD 404. In other words, the HAN devices 806 may receive objective demand responses 816*b* and, using the translation rules 850, produce control functions 848. When executed or implemented, the control functions 848 may allow the HAN devices 806 to comply with the demand responses 816*a*, 816*b*.

The HAN devices 806 may still include a non-secure communication module 812. Additionally, the HAN device may include device preferences 860 that may be received through a user interface 868.

Alternatively, the utility meter 802 and the HAN devices 806 may communicate using various methods including, but not limited to, an infrared (IR) connection, an Ethernet connection, a wireless connection using the 802.11g (WiFi) standard, or other wired or wireless connections.

Figure 9:
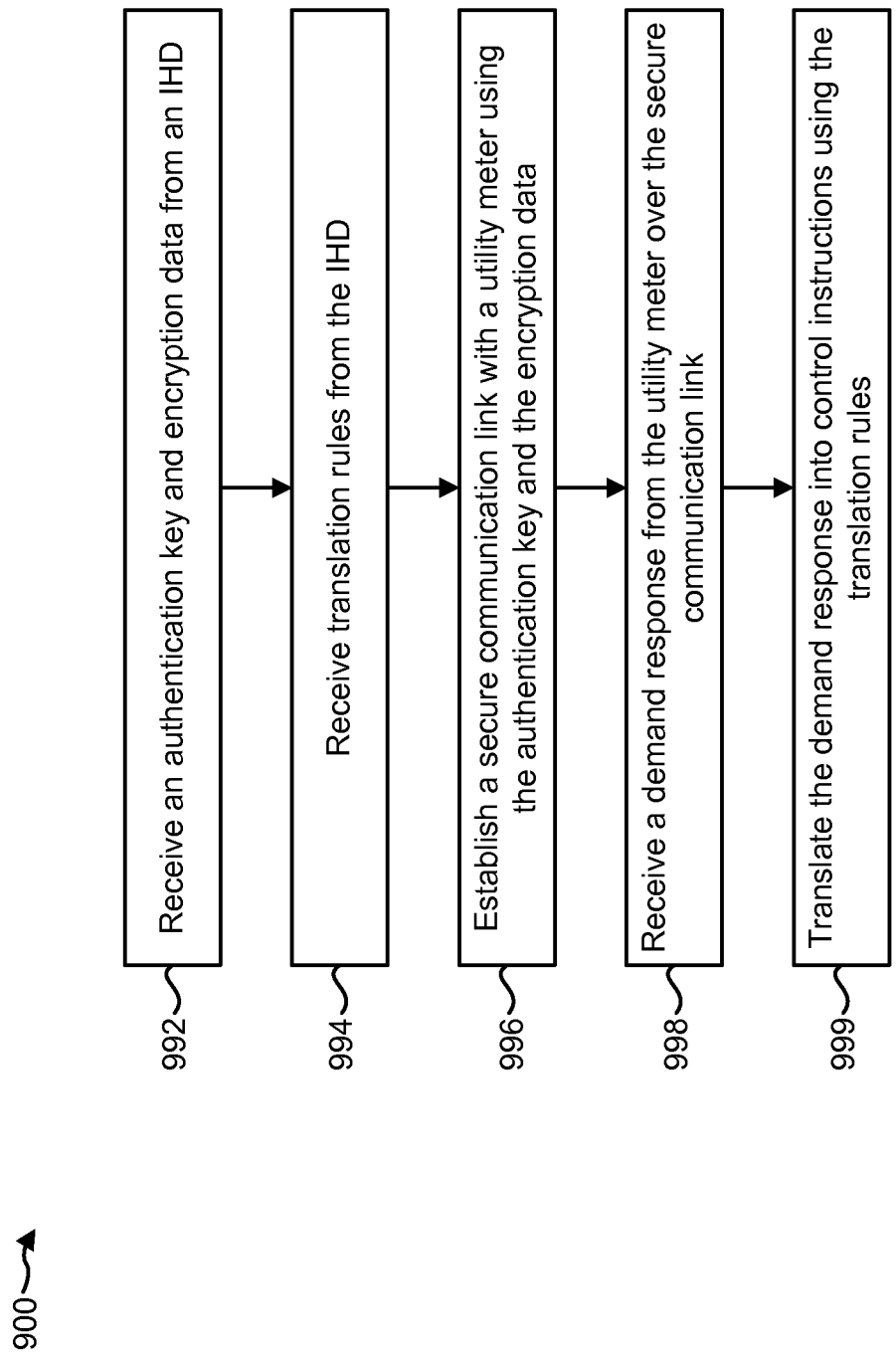
FIG. 9 is a flow diagram illustrating a method for re-commissioning a controlled device in a home area network.

FIG. 9 is a flow diagram illustrating a method 900 for re-commissioning a controlled device 406 in a home area network 408. The method 900 may be performed in a HAN device 406. The HAN device 406 may receive 992 an authentication key 432 and encryption data 434 from an IHD 404. Likewise, the HAN device 406 may receive 994 translation rules 450 from the IHD 404. The translation rules 450 may be a subset of the control logic 446 used by the IHD 404 to translate objective demand responses 416 into directive control functions 448. The authentication key 432, encryption data 434, and translation rules 450 may be received 994 from the IHD 404 during a power-up sequence of the IHD 404 or shortly thereafter. Additionally, the translation rules 450 may be received 994 periodically, e.g., whenever the device preferences 460 change.

Then, the HAN device 406 may establish 996 a secure communication link with a utility meter 402 using the authentication key 432 and the encryption data 434. This may include communicating using ZigBee SE. Then the HAN device 406 may receive 998 a demand response 416 from the utility meter 402 over the secure communication link. The demand response 416 may be in the form of an objective, e.g., reduce power consumption by 5% over the next hour. The HAN device 406 may then translate 999 the demand response 416 into control instructions 448 using the translation rules 450. The control instructions 448 may be in the form of a directive, e.g., turn the pool heater OFF.

Alternatively, the utility meter 402, the IHD 404, and the HAN devices 406 may communicate using various methods including, but not limited to, an infrared (IR) connection, an Ethernet connection, a wireless connection using the 802.11g (WiFi) standard, or other wired or wireless connections.

FIG. 10 is a block diagram illustrating multiple configurations of possible screenshots 1031 on a IHD 404. The IHD 404 may include a display that receives input from a user via touchpad, buttons, keyboard, etc., or the IHD 404 may be connected to a separate display, e.g., a television or computer monitor. Each screenshot 1031 may include configuration buttons 1033 that may configure the displayed data 1035. For example, a user may choose a monthly, daily, or hourly view of their energy use in bar graph form 1035*a*, pie chart form 1035*b*, or raw numbers 1035*c*. Each display may also include navigation buttons 1037 that allow the user to navigate between views. For example, a user may switch the view between overall energy use 1039*a*, 1039*b*, device views 1039*c*, and a home energy manager 1039*d*, 1039*e*, and device preferences 1039*f*. The display may also include control buttons 1041 that change settings within a device 206 or a HAN 208. For example, using the control buttons 1041, a user may turn the thermostat to heat 1041*a*, cool 1041*b*, OFF 1041*c*, or adjust the temperature set point 1045*b* up or down and may turn the fan to auto 1041*d*, ON 1041*e*, or OFF 1041*f*. Additionally, the display may also notify a user of any alerts 1043, such as received demand responses 416 and allow them to override 1041*i* or comply 1041*j* with the alert 1043. Likewise, the display may also include device specific data, such as the current temperature 1045*a* and the current temperature set point 1045*b* for a thermostat 1039*c*.

Additionally still, the IHD 404 may display and change the user preferences 1060 for one or more HAN devices 406 using the configuration buttons 1033. For example, in response to a maximum conserve demand response 416, the user may choose to change the set point on the thermostat to 82 degrees, turn the dryer OFF, and turn the hot water heater OFF. Thus, when a maximum conserve demand response 416 is received, the control logic 446 in the IHD 404, or the translation rules 450 in the HAN device 406, may use the device preferences 1060 to create control functions 448 that comply with the demand response 416. Device preferences 1060 may be created for many different types of demand responses 416 and HAN devices 406.

Figure 11:
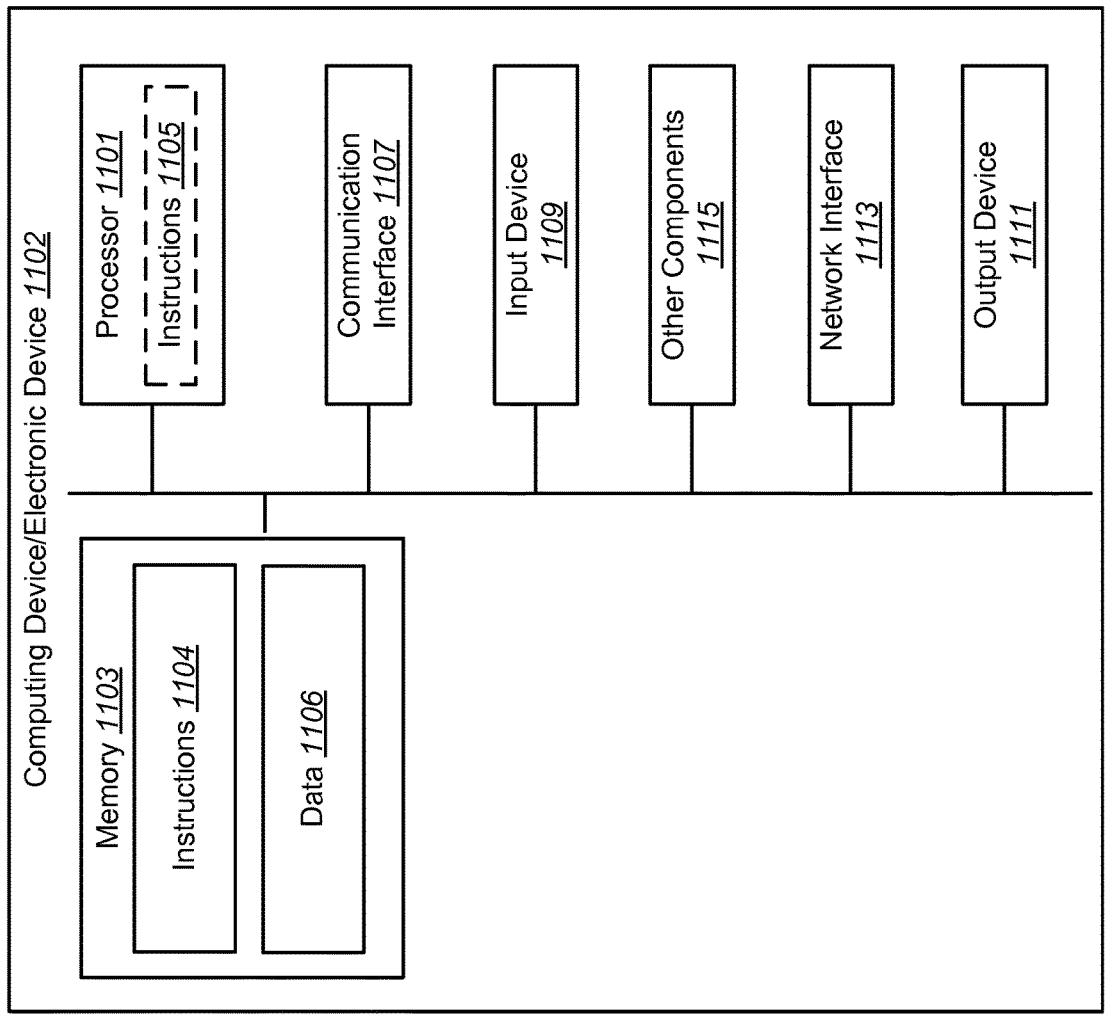
FIG. 11 is a block diagram illustrating various components that may be utilized in a computing device/electronic device.

FIG. 11 is a block diagram illustrating various components that may be utilized in a computing device/electronic device 1102. The computing device/electronic device 1102 may implement a utility meter 402, an IHD 404, or a HAN device 406. Thus, although only one computing device/electronic device 1102 is shown, the configurations herein may be implemented in a distributed system using many computer systems. Computing devices/electronic devices 1102 may include the broad range of digital computers including microcontrollers, hand-held computers, personal computers, servers, mainframes, supercomputers, minicomputers, workstations, and any variation or related device thereof.

The computing device/electronic device 1102 is shown with a processor 1101 and memory 1103. The processor 1101 may control the operation of the computing device/ electronic device 1102 and may be embodied as a microprocessor, a microcontroller, a digital signal processor (DSP) or other device known in the art. The processor 1101 typically performs logical and arithmetic operations based on program instructions stored within the memory 1103. The instructions 1104 in the memory 1103 may be executable to implement the methods described herein.

The computing device/electronic device 1102 may also include one or more communication interfaces 1107 and/or network interfaces 1113 for communicating with other electronic devices. The communication interface(s) 1107 and the network interface(s) 1113 may be based on wired communication technology, and/or wireless communication technology, such as ZigBee SE or ZigBee HA.

The computing device/electronic device 1102 may also include one or more input devices 1109 and one or more output devices 1111. The input devices 1109 and output devices 1111 may facilitate user input. Other components 1115 may also be provided as part of the computing device/electronic device 1102.

Data 1106 and instructions 1104 may be stored in the memory 1103. The processor 1101 may load and execute instructions 1104 from the instructions 1104 in memory 1103 to implement various functions. Executing the instructions 1104 may involve the use of the data 1106 that is stored in the memory 1103. The instructions 1104 are executable to implement one or more of the processes or configurations shown herein, and the data 1106 may include one or more of the various pieces of data described herein.

The memory 1103 may be any electronic component capable of storing electronic information. The memory 1103 may be embodied as random access memory (RAM), read only memory (ROM), magnetic disk storage media, optical storage media, flash memory devices in RAM, on-board memory included with the processor, EPROM memory, EEPROM memory, an ASIC (Application Specific Integrated Circuit), registers, and so forth, including combinations thereof.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for preparing a controlled device to re-commission itself in a home area network, the method comprising:
   communicating with a utility meter by an in-home display;
   determining, at the in-home display, an authentication key and encryption data for communicating with the utility meter;
   sending, from the in-home display, the authentication key and encryption data to a controlled device using a ZigBee Home Automation profile;
   determining, at the in-home display, a set of translation rules that translate an objective received in a message from the utility meter into directive control functions specific to the controlled device, wherein the objective comprises a request to reduce power consumption without specifying tasks to reduce the power consumption, and wherein the directive control functions comprise tasks that reduce the power consumption;
   sending, from the in-home display, the set of translation rules to the controlled device;
   determining new translation rules on the in-home display in response to a user preference on the controlled device being changed;
   receiving the message from the utility meter;
   translating the message into control instructions specific to the controlled device, wherein the control instructions cause the controlled device to comply with the message; and
   sending the control instructions to the controlled device.

2. The method of claim 1, wherein the communicating comprises communicating using a ZigBee Smart Energy profile.

3. The method of claim 1, further comprising:
   sending the new translation rules to the controlled device.

4. An in-home display apparatus for preparing a controlled device to re-commission itself in a home area network, comprising:
   a processor;
   memory in electronic communication with the processor;
   instructions stored in the memory, the instructions being executable by the processor to:
   communicate with a utility meter by the in-home display apparatus;
   determine, at the in-home display apparatus, an authentication key and encryption data for communicating with the utility meter;
   send, from the in-home display apparatus, the authentication key and encryption data to a controlled device using a ZigBee Home Automation profile;
   determine, at the in-home display apparatus, a set of translation rules that translate an objective received in a message from the utility meter into directive control functions specific to the controlled device, wherein the objective comprises a request to reduce power consumption without specifying tasks to reduce the power consumption, and wherein the directive control functions comprise tasks that reduce the power consumption;
   send, from the in-home display apparatus, the set of translation rules to the controlled device;

determine new translation rules on the in-home display apparatus in response to a user preference on the controlled device being changed;

receive the message from the utility meter;

translate the message into control instructions specific to the controlled device, wherein the control instructions cause the controlled device to comply with the message; and send the control instructions to the controlled device.

5. The apparatus of claim 4, wherein the instructions for communicating further comprise instructions executable to communicate using a ZigBee Smart Energy profile.

6. The apparatus of claim 4, further comprising instructions executable to:

send the new translation rules to the controlled device.

7. A non-transitory computer-readable storage medium for preparing a controlled device to re-commission itself in a home area network, the computer readable medium comprising executable instructions for:

communicating with a utility meter by an in-home display;

determining, at the in-home display, an authentication key and encryption data for communicating with the utility meter;

sending, from the in-home display, the authentication key and encryption data to a controlled device using a ZigBee Home Automation profile;

determining, at the in-home display, a set of translation rules that translate an objective received in a message from the utility meter into directive control functions specific to the controlled device, wherein the objective comprises a request to reduce power consumption without specifying tasks to reduce the power consumption, and wherein the directive control functions comprise tasks that reduce the power consumption; and sending, from the in-home display, the set of translation rules to the controlled device;

determining new translation rules on the in-home display in response to a user preference on the controlled device being changed;

receiving the message from the utility meter;

translating the message into control instructions specific to the controlled device, wherein the control instructions cause the controlled device to comply with the message; and sending the control instructions to the controlled device.

8. The non-transitory computer-readable storage medium of claim 7, wherein the instructions for communicating comprise instructions for communicating using a ZigBee Smart Energy profile.

9. The non-transitory computer-readable storage medium of claim 7, further comprising instructions for:

sending the new translation rules to the controlled device.

10. A method for re-commissioning a controlled device in a home area network, the method comprising:

receiving using a ZigBee Home Automation profile, by a home area network device, an authentication key and encryption data from an in-home display;

receiving translation rules, by the home area network device, from the in-home display for a message from a utility meter, wherein the authentication key, encryption data and translation rules are received from the in-home display during a start-up sequence of the in-home display;

establishing using a ZigBee Smart Energy profile, by the home area network device, a secure communication link with the utility meter using the authentication key and the encryption data;

receiving, by the home area network device, a request to change power usage in a controlled device from the utility meter over the secure communication link; and translating, by the home area network device, the request to change power usage into control instructions using the translation rules, wherein the translation rules translate an objective received in the request from the utility meter into directive control functions specific to the controlled device, wherein the objective does not specify tasks to change the power usage, and wherein the directive control functions comprise tasks that change the power usage.

11. The method of claim 10, further comprising:

executing the control instructions.

12. A home area network apparatus for preparing a controlled device to re-commission itself in a home area network, comprising:

a processor;

memory in electronic communication with the processor;

instructions stored in the memory, the instructions being executable by the processor to:

receive using a ZigBee Home Automation profile, by the home area network apparatus, an authentication key and encryption data from an in-home display;

receive, by the home area network apparatus, translation rules from the in-home display for a message from a utility meter, wherein the authentication key, encryption data and translation rules are received from the in-home display during a start-up sequence of the in-home display;

establish using a ZigBee Smart Energy profile, by the home area network apparatus, a secure communication link with the utility meter using the authentication key and the encryption data;

receive, by the home area network apparatus, a request to change power usage in a controlled device from the utility meter over the secure communication link; and translate, by the home area network apparatus, the request to change power usage into control instructions using the translation rules, wherein the translation rules translate an objective received in the request from the utility meter into directive control functions specific to the controlled device, wherein the objective does not specify tasks to change the power usage, and wherein the directive control functions comprise tasks that change the power usage.

13. The apparatus of claim 12, further comprising instructions executable to:

execute the control instructions.

* * * * *

UNITED STATES PATENT AND TRADEMARK OFFICE
CERTIFICATE OF CORRECTION

PATENT NO. : 9,813,383 B2
APPLICATION NO. : 12/858231
DATED : November 7, 2017
INVENTOR(S) : Paul E. Nagel et al.

Page 1 of 1

It is certified that error appears in the above-identified patent and that said Letters Patent is hereby corrected as shown below:

In the Specification

In Column 5, Line 36, please delete "FIG. 10" and replace it with --FIG. 1C--.

Signed and Sealed this
Twenty-fourth Day of April, 2018

Andrei Iancu
*Director of the United States Patent and Trademark Office*